United States Patent [19]
Ueda et al.

[11] Patent Number: 5,753,498
[45] Date of Patent: May 19, 1998

[54] GARBAGE TREATING APPARATUS

[75] Inventors: Masako Ueda, Mito; Masaru Nanba, Hitachinaka; Masahiko Ishida, Hitachi; Setuo Saitou, Hitachi; Kenji Baba, Hitachi, all of Japan

[73] Assignee: Hitachi, Ltd., Tokyo, Japan

[21] Appl. No.: 645,621

[22] Filed: May 14, 1996

[30] Foreign Application Priority Data

May 19, 1995 [JP] Japan .................. 7-121089

[51] Int. Cl.$^6$ ........................... C12M 1/02
[52] U.S. Cl. .................. 435/290.2; 435/290.4; 435/286.7; 366/320; 366/323
[58] Field of Search ............ 435/290.2, 290.3, 435/290.4, 286.7; 71/9; 366/314, 318, 320, 322, 323, 324

[56] References Cited

U.S. PATENT DOCUMENTS

| | | |
|---|---|---|
| 2,851,257 | 9/1958 | Morgan ................... 366/320 |
| 5,292,637 | 3/1994 | Bohnensieker ............. 435/290.3 |
| 5,462,354 | 10/1995 | Neier ..................... 366/323 |

FOREIGN PATENT DOCUMENTS

| | | | |
|---|---|---|---|
| 38 44 700 | 11/1990 | Germany .............. 435/290.4 |
| 41 14 160 | 5/1992 | Germany .............. 435/290.4 |
| 59-190284 | 10/1984 | Japan ................. 435/290.2 |
| 63-288986 | 11/1988 | Japan . | |
| 6-262159 | 9/1994 | Japan . | |
| 1 037 665 | 8/1966 | United Kingdom ...... 366/320 |
| 2 003 043 | 3/1979 | United Kingdom ...... 366/323 |

Primary Examiner—William H. Beisner
Attorney, Agent, or Firm—Antonelli, Terry, Stout, & Kraus, LLP

[57] ABSTRACT

An agitating unit is provided in an upright fermenting reactor for purposes of carrying garbage from a lower portion toward an upper portion of the fermenting reactor. The horizontal distance between the agitator unit, or a spiral blade thereof, and an inner wall surface of the fermenting reactor is made larger in proportion to the axial position of the agitator unit toward the upper portion of the fermenting reactor. On the other hand, an opening between the spiral blade and its drive shaft may made larger in proportion to the axial position of the agitator unit toward the upper portion of the fermenting reactor. With such an arrangement, a flow from a lower portion toward the upper portion and a flow from the upper portion toward the lower portion are simultaneously formed. Due to the ascending flow and the descending flow, the garbage and the compost in the fermenting reactor can be easily mixed with each other and the decomposition of the garbage can speeded up, so that it is possible to carry out a continuous fermentation operation.

18 Claims, 2 Drawing Sheets

GARBAGE TREATING APPARATUS

BACKGROUND OF THE INVENTION

The present invention relates to a garbage treating apparatus and, more particularly, to a garbage treating apparatus which is suitable for reducing garbage, such as vegetables dispensed from the home, by mixing the garbage with aerobic fungi and fermenting the garbage to an aerobic fungus and by decomposing the garbage to water and carbon dioxide gas.

Recently, more attention has been given to garbage treating apparatus, because the garbage is decomposed by such apparatus, in large part, to water and carbon dioxide gas by the work of a bacteria. Also, the garbage is reduced substantially in weight to only about one-tenth of original weight of the garbage. A further advantage results from the fact that only a soil-form product and light dust remains, and these elements can be reused as compost.

As one kind of a garbage treating apparatus for composting garbage through fermentation, there is a fermenting reactor which is disposed on its side, i.e. with its longitudinal axis horizontal, and into which garbage is introduced at one end. By operating a garbage agitating means provided in the fermenting reactor, the garbage is agitated and transferred to the other end thereof. Between the one end and the other end of the fermenting reactor, the garbage is decomposed through the working of bacteria and compost is produced. One example of this type of conventional garbage treating apparatus is disclosed in Japanese patent laid-open publication No. 288,986/1988.

In the above stated conventional garbage treating apparatus, the fermentation is performed by mixing the newly introduced garbage into the compost left over in the fermenting reactor. The compost includes a large number of bacteria and the garbage is decomposed by the working of the bacteria. In the conventional garbage treating apparatus of this type, where the fermenting reactor is disposed on its side, since the garbage is always introduced from the one end of the fermenting reactor and the compost generated by the fermentation is taken out from the other end of the fermenting reactor, it is possible to carry out a continuous fermentation operation.

On the other hand, a garbage treating apparatus where a fermenting reactor is disposed upright with a vertical orientation is disclosed in, for example, Japanese patent laid-open publication No. 262,159/1994.

In the garbage treating apparatus used in a home, it is necessary for the apparatus to have the following important factors. Namely, the garbage treating apparatus itself should have a low cost and provide low cost operation, and it should have a compact size, a high cleanness, a high hygiene, an odorless structure, and a good handling operation.

In the garbage treating apparatus where the garbage is conveyed in the lateral direction, a continuous fermentation operation of the garbage is carried out. However, since the rotating shaft of the garbage agitating means is disposed in a horizontal direction, the torque of the motor which drives the shaft is large and the cost of the apparatus becomes high. On the other hand, in the garbage treating apparatus where the fermenting reactor is disposed upright with a vertical orientation, there are advantages in that a compact size apparatus can be obtained and the torque of the motor which drives the agitating means can be small because the rotating shaft therefor extends in the vertical direction.

However, in such an upright garbage treating apparatus, there is a problem in that it is difficult to mix the garbage with the compost, which is indispensable to effectively dissolving the garbage. In the conventional upright garbage treating apparatus described in the above stated Japanese patent laid-open publication No. 262,159/1994, a garbage circulating system is employed in an effort to solve this problem, wherein the garbage supplied from the bottom portion of the fermenting reactor is again supplied to the top portion of the fermenting reactor so that the garbage is conveyed again through the fermenting reactor to the bottom portion thereof. With the above stated garbage circulating system, the garbage is effectively mixed with the compost, however this garbage circulating system is not suitable to carry out a continuous fermentation operation.

SUMMARY OF THE INVENTION

An object of the present invention is to provide a garbage treating apparatus which has a fermenting reactor disposed upright with a vertical orientation and in which the garbage can be mixed with the compost without a circulation of the garbage between an interior portion of the fermenting reactor and an outside portion of the fermenting reactor.

Another object of the present invention is to provide a garbage treating apparatus wherein a continuous fermentation operation of the garbage can be carried out without a circulation of the garbage between an outlet of a fermenting reactor and an inlet of the fermenting reactor along a path outside of the fermenting reactor.

A further object of the present invention is to provide a garbage treating apparatus wherein a garbage treatment operation from the start of crushing of the garbage to the end of cutoff of water supply to the garbage can be automated.

According to the present invention, a garbage treating apparatus comprises a cylindrical fermenting reactor disposed upright with a vertical orientation, and a garbage agitating means provided in the fermenting reactor. The garbage is introduced from a lower portion of the fermenting reactor and compost produced by a fermentation of the garbage is discharged from an upper portion of the fermenting reactor, and the garbage is pushed up toward the upper portion of the fermenting reactor by agitating the garbage using the garbage agitating means.

The garbage treating apparatus further comprises a means for generating a special kind of flow of the materials in the fermenting reactor so as to produce a mixing. This flow generating means generates a flow from the upper portion of the fermenting reactor to the lower portion of the fermenting reactor, when the garbage is pushed up from the lower portion of the fermenting reactor to the upper portion of the fermenting reactor using the garbage agitating means. One flow is formed from the lower portion of the fermenting reactor toward the upper portion of the fermenting reactor and another flow is formed from the upper portion of the fermenting reactor toward the lower portion of the fermenting reactor within the fermenting reactor itself. The two flows are simultaneously generated in the fermenting reactor. Thereby, it is possible to homogeneously mix the garbage with the compost to a high degree, so that it is possible to easily dissolve the garbage.

The heavy garbage may tend to drop down toward the bottom of the fermenting reactor due to gravity, however, according to the present invention, with the formation of the above stated two flows (an ascendant flow and a descendant flow) in the upper and lower directions, it is possible to homogeneously mix the heavy garbage with the light garbage. Therefore, it is possible to uniformly proceed the fermentation treatment operation in the fermenting reactor.

Further, by forming the above stated two flows (the ascendant flow and the descendant flow) in the upper and lower directions, it is possible to obtain an effect wherein good contact between the garbage and the oxygen in the air can be attained.

As the garbage agitating means, it is possible to employ plural agitators installed on a rotating shaft or plural spiral blades mounted on the rotating shaft. The horizontal distance between an inner wall of the fermenting reactor and a tip end portion of the agitator is made larger in proportion to the distance from the upper end of the fermenting reactor. As an example, the horizontal distance between the inner wall of the fermenting reactor and a tip end portion of the spiral blade may be made larger in proportion to the distance from the upper end of the fermenting reactor. With such an arrangement, it is possible to generate a flow for the garbage from the upper portion of the fermenting reactor toward the lower portion of the fermenting reactor at the peripheral portion of the inner wall surface of the fermenting reactor.

For purposes of changing the horizontal distance between the inner wall surface of the fermenting reactor and the agitator or the spiral blade, the dimension of the agitator may be made larger in proportion to the proximity to the upper end of the fermenting reactor or the dimension of the spiral blade may be made larger in proportion to the distance from the upper end of the fermenting reactor. Or, by making the dimension of the agitator or the dimension of the spiral blade constant, the horizontal cross-sectional area of the fermenting reactor can be made larger in proportion to the proximity to the upper end of the fermenting reactor.

When the dimension of the spiral blade is made larger in proportion to the proximity to the upper end of the spiral blade, in the horizontal direction between the tip end portion of the spiral blade and the inner wall surface of the fermenting reactor, it is desirable to set the horizontal distance at the uppermost stage of the spiral blade to be at least five times the horizontal distance at the lowermost stage of the spiral blade. When the difference between the horizontal distance at the uppermost stage of the spiral blade and that of at the lowermost stage of the spiral blade is excessively small, the flow of garbage from the upper portion toward to the lower portion is weakened at the peripheral portion of the inner wall surface of the fermenting reactor.

As the garbage agitating means, it is possible to employ a spiral blade in which an opening is provided on a peripheral portion of the rotating shaft which drives the spiral blade. In this case, in accompaniment with the rotation of the spiral blade, at the peripheral portion of the rotating shaft, it is possible to form a flow for the garbage from the upper portion of the spiral blade toward the lower portion of the spiral blade through this opening between the rotating shaft and the spiral blade.

When such an opening is formed by the spiral blade, it is desirable to set the length of the opening in the horizontal direction at the uppermost stage of the spiral blade to be at least three times that at lowermost stage of the spiral blade. This is so that the flow from the upper portion of the spiral blade toward the lower portion of the spiral blade will not be weakened.

According to the present invention, a garbage treating apparatus comprises a container, a cylindrical fermenting reactor disposed upright with a vertical orientation of the container, a garbage introducing port provided toward a lower portion of the fermenting reactor, a discharging port for compost produced by fermentation of the garbage provided toward an upper portion of the fermenting reactor, a receiving box for receiving the compost discharged from the fermenting reactor, a garbage inlet port having a lid provided on the container, a passage for guiding the garbage passing through the garbage inlet port to the garbage introducing port, a garbage crushing means provided midway of the garbage guiding passage, a water drainage means provided on the midway of the garbage guiding passage, and a garbage agitating means for pushing up the garbage in the fermenting reactor by agitating the garbage in the fermenting reactor.

The garbage treating apparatus further comprises a means for generating a flow from the upper portion of the fermenting reactor toward the lower portion of the fermenting reactor, when the garbage is pushed up from the lower portion of the fermenting reactor toward the upper portion of the fermenting reactor by the agitating means.

According to the above stated garbage treating apparatus, it is possible to obtain an effect where the fermentation treatment from the start of the garbage crushing operation to the garbage water cutoff can be fully automated. In the garbage treating apparatus where the treatment from the start of the crushing of the garbage to the end of the fermentation treatment can be automated, a sloped surface is formed on the garbage guiding passage and a slit for draining water is provided on the sloped surface. It is also desirable to provide a piping means for discharging water that has passed through the slit toward the outside portion of the container.

Further, as the garbage crushing means, plural agitating arms may be fixed in an axial direction to the rotating shaft and plural fixed arms secured to an inner wall surface of the garbage guiding passage. By the rotation of the agitating arms, the garbage can be crushed between the agitating arms and the fixed arms. However, it is more desirable to install a spiral blade on the rotating shaft so that the garbage is transferred into the fermenting reactor by means of the spiral blade.

To easily dissolve the garbage, it is important for the garbage to be minutely crushed and the moisture content to be cut off, however it is a problem to carry out these operations manually. Thus, according to the present invention, these operations are automated.

It is desirable to provide a water injecting means in the vicinity of the lower portion of the garbage inlet port having the lid and with this water injecting means it is possible to clean the vicinity of the garbage inlet port. Accordingly, it is possible to prevent or lessen any unpleasant smell generated when the lid is opened to throw the garbage into the fermenting reactor. Further, since the area in the vicinity of the garbage inlet port is cleaned, it is possible to maintain a highly hygienic garbage treating apparatus.

To ferment the garbage commonly requires a temperature of several ten °C. In accordance with the present invention, a heater is provided on an outer side wall surface of the cylindrical fermenting reactor, and further it is desirable to provide a means for controlling the temperature of the heater. However, in the fermentation treatment of the garbage, there are two methods. One of the two methods is a thermophile fermentation operation in which the garbage is fermented at a temperature of about 50°–70° C., and the other of the two methods is a mesophile fermentation operation in which the garbage is fermented at a temperature of less than 50° C., which is lower than that of the thermophile fermentation operation.

In the case of the mesophile fermentation operation, hemilose or pectin serving as a redundant decomposition component is redundantly fermented. Further, in comparison with the thermophile fermentation operation, the mesophile fermentation requires a time for the decomposition of starch, protein, and fat as an easy decomposition component. On the other hand, in the case of the thermophile fermentation operation, the time required for the decomposition of the easy decomposition component is short in comparison with that of the mesophile fermentation operation. Accordingly, the generated compost is not completely matured as manure. Thereby, when the generated compost is applied to crops, for example, the compost is decomposed in the soil and it may produce bad effects, such as a germination impediment, or an impediment against growth of the crops.

In order to obtain completely matured good compost, it is necessary to dissolve both the easy decomposition components and the redundant decomposition components. Namely, it is desirable to carry out both the thermophile fermentation operation and the mesophile fermentation operation. When a heater is provided on the outer side wall surface of the fermenting reactor and the fermenting reactor is heated to the temperature where the garbage is fermented with a high temperature, the interior portion of the fermenting reactor has the temperature suitable to carry out the thermophile fermentation operation. Besides, in the outer side of the fermenting reactor cooling is obtained from the wall surface of the container, so that it can hold the temperature suitable to carry out the mesophile fermentation operation. As a result, the compost that is discharged from the fermenting reactor and received in the receiving box is successively fermented by the mesophile fermentation operation and then the compost is completely matured.

Since the fermentation of the garbage is carried out through aerobic fermentation, in accordance with the present invention, it is desirable to provide a gas supplying means for supplying oxygen containing gas into the fermenting reactor from the outside of the container. As one example, a garbage agitating means is provided in the fermenting reactor in the form of an agitator or a spiral blade fixed to a rotating shaft in the form of a hollow tube and plural holes are provided midway of the hollow rotating shaft. Thereby, oxygen containing gas can be supplied to the fermenting reactor from the outside of the container through the holes in the hollow tube rotating shaft.

By the provision of a partitioning wall which is movable in upper and lower directions with respect to the wall surface of the fermenting reactor, and by judging the degree of fermentation, it is desirable to vary the height of the compost discharging port through movement of the partitioning wall.

Further, with the provision of a removal means for removing the humidity or the smell in the container, by detecting the oxygen concentration or the humidity in the fermenting reactor, it is possible to control the temperature of the heater or the agitating force of the agitating means disposed in the fermenting reactor.

In the garbage treating apparatus where the fermenting reactor is disposed upright with a vertical orientation, the garbage agitating means may be disposed in the fermenting reactor in the form of an agitator or spiral blade mounted on a rotating shaft. In accompaniment with the garbage in the fermenting reactor and the compost in the fermenting reactor, which are agitated and mixed, a flow from the lower portion of the fermenting reactor toward the upper portion of the fermenting reactor and a flow from the upper portion of the fermenting reactor toward the lower portion of the fermenting reactor are simultaneously formed. Thereby, due to the formation of the above stated two flows, the garbage and the compost are homogeneously mixed to a high degree.

In the garbage treating apparatus where the fermenting reactor is disposed upright with a vertical orientation, there is a problem that heavy pieces of garbage within the garbage naturally tend to stay at the lower portion of the fermenting reactor. However, according to the present invention, by the formation of the ascending flow and the descending flow, since the heavy garbage pieces are pushed up and the light garbage matter is pushed down, it is possible to uniformly mix the garbage in the fermenting reactor at the upper and lower portions.

Further, in the garbage treating apparatus where the fermenting reactor is disposed upright with a vertical orientation, since the garbage in contact with the air is positioned only at the upper portion of the fermenting reactor, there is a fear that the interior portion of the fermenting reactor easily reaches an anaerobic condition. However, according to the present invention, by the formation of the ascending flow and the descending flow, since the garbage can circulate toward the upper and lower portions of the fermenting reactor, the garbage has a good contact with air, whereby an aerobic condition can be maintained.

The garbage agitating means disposed in the fermenting reactor can perform the function of agitating and mixing the garbage with the compost and the function of forming the ascending flow and the descending flow. Accordingly, as the garbage agitating means, it is preferable to employ a device that can perform functions. For example, it is possible to use a garbage agitating means in which plural agitating arms are fixed to the rotating shaft, the agitating arms having a shorter length in proportion to the distance from the upper end.

Also, it is possible to use a garbage agitating means in which plural agitating arms and plural spiral blades are fixed to the rotating shaft, the agitating arms having a shorter length in proportion to the diameter of the upper portion, or the spiral blade having a small dimension in proportion to the distance from the upper end, or more desirably to employ one in which the spiral blade is positioned at the lower portion and the agitator is positioned at the upper portion.

Since the fermenting reactor and the garbage agitating means are disposed in the same container and the garbage crushing means is also provided in the container, it is possible to automated a series of treatment operations from the start of the crushing of the garbage to the completion of the fermentation treatment of the garbage.

Since a water drainage means for removing the moisture content of the garbage is provided in the container, it is possible to simplify the water removal operation by manual means. To speed up the decomposition produced by the fermentation of the garbage, it is necessary to finely crush the garbage and to remove water from the garbage. The need for the garbage to be crushed in advance before the garbage is supplied into the container creates a very bad handling condition. However, by the provision of the garbage crushing means in the container, it is possible avoid this problem. Further, by the provision of the water drainage means downstream of the garbage crushing means, it is possible to save the time required for water drainage or removal of the moisture content produced during the garbage crushing. By the provision of the water drainage means, it is possible to clean in the vicinity of the garbage inlet port by injecting water in the vicinity of the garbage inlet port of the container.

To easily transfer the crushed garbage to the fermenting reactor, it is desirable to provide the container with a garbage guiding passage having a sloped portion and in this sloped portion it is desirable to provide a slit for providing the above stated garbage crushing means or the water drainage means.

Further, in this garbage guiding passage it is preferable to provide agitating means in which a spiral blade is mounted on a rotating shaft to transfer the crushed garbage to the fermenting reactor. By detecting the rotation speed of the agitating means provided in the garbage guiding passage and the rotation speed of the agitating means in the fermenting reactor and linking together the rotation speeds of both agitating means, it is possible to smoothly transfer the garbage from the garbage guiding passage to the fermenting reactor.

By the provision of the partitioning wall for shielding the garbage introducing port of the fermenting reactor from the garbage guiding passage, it is possible to prevent a reverse flow of the garbage and the compost from the fermenting reactor to the garbage guiding passage.

In case of a structure wherein the fermentation matter after completion of the fermentation treatment is supplied to the receiving box by overflowing from an upper outlet of the fermenting reactor, there is the fear that the matter which just has been thrown-in and which is not completely fermented may enter the receiving box. To prevent occurrence of such problem, it is desirable to provide a movable partitioning wall so as to adjust the height or the dimension of the opening of the cylindrical fermenting reactor through movement of this partitioning wall in the upper and lower direction. During the fermentation treatment, by closing the opening, it is possible to prevent matter from falling down midway during the fermentation treatment into the receiving box.

It is desirable to carry out the following operations. Namely, through the detection of the oxygen concentration or the humidity of the fermenting reactor, the moisture containing rate of the fermentation matter, the moisture content concentration or carbon dioxide concentration of the exhaust gas generated by the fermentation and the agitating speed of the agitating means, the degree of fermentation is judged, and then the discharge of the garbage from the fermenting reactor to the receiving box is controlled.

DESCRIPTION OF THE INVENTION

Hereinafter, one embodiment of a garbage treating apparatus according to the present invention will be explained with reference to drawings.

Figure 1:
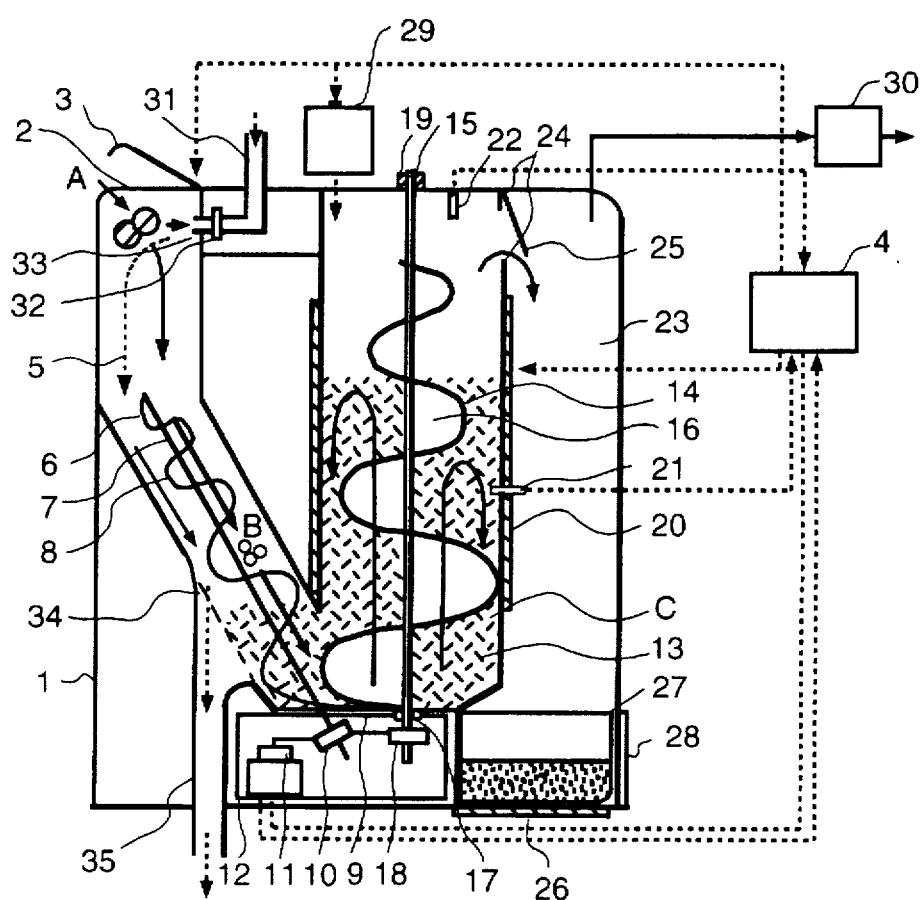
FIG. 1 is a schematic diagram showing one embodiment of a garbage treating apparatus according to the present invention.

In the garbage treating apparatus, according to the present invention, as shown in FIG. 1, raw garbage material A is thrown into a container 1 having a lid 3 covering a garbage inlet port 2. In this embodiment, the opening and/or closing of the lid 3 is automatically carried out by a measuring and controlling unit 4 having a display panel, however the apparatus is not limited thereto.

A water injecting means is provided in the vicinity of the garbage inlet port 2 of the container 1. The water injecting means is constituted by a water introducing pipe 31 in which city water flows, an electromagnetic valve 32 and a nozzle 33. After the garbage enters the container 1, the water is injected from the nozzle 33 so that the area in the vicinity of the garbage inlet port 2 is cleaned. As a result, the area in the vicinity of the garbage inlet port 2 can be maintained under a clean condition, so that, when the lid 3 is opened, it is possible to prevent or restrain the appearance of a bad smell. The water, which was used to clean the area in the vicinity of the garbage inlet port 2, flows as shown by the dashed-line arrow and is discharged to the outside of the container 1 via the pipe 35.

A garbage guiding passage 5 is provided in the container 1 and this garbage guiding passage 5 continues from the garbage inlet port 2 to the garbage introducing port of a fermenting reactor 13. A sloped surface portion is provided on a part of the garbage guiding passage 5 and plural slits 34 are provided on a portion of the sloped surface, along which there is provided a garbage crushing means, a garbage agitating means and a water drainage means.

The first garbage agitating means comprises a rotating shaft 7 and a spiral blade 8 mounted on the rotating shaft 7. The dimension of the spiral blade 8 is made to correspond largely to the size of the lower portion of the guiding passage 5, as a result of which the garbage is forced into the garbage introducing port of the fermenting reactor 13. Plural cutting edges 6 for crushing and shredding the garbage are installed on a part of the rotating shaft 7 and the garbage is crushed by those cutting edges 6. With this garbage crushing means, it is desirable to crush and shed the garbage to a size smaller than 20 mm. The rotating shaft 7 is connected to a drive means 12 through a rotating shaft bearing support means 9 and a gear means 10.

The garbage thrown in the container 1 has a certain moisture content, and so, when the garbage is crushed the moisture content produces water. However, since the slits 34 are provided on a part of the slope surface portion of the garbage guiding passage 5, it is possible to remove water produced by the moisture in the garbage through the slits 34. The water passing through the slits 34 flows to a drainage means including a piping means 35.

The raw garbage material A is finely crushed by means of the garbage crushing means and becomes raw garbage material of smaller particulate size, which is introduced into the fermenting reactor 13. This fermenting reactor 13 has a cylindrical shape and is disposed upright with a vertical orientation.

A garbage agitating means 14 comprises a rotating shaft 15 and a spiral blade 16. Since the garbage agitating means 14 is provided within the fermenting reactor 13, the garbage raw material B introduced into the fermenting reactor 13 is mixed with the compost produced in the fermenting reactor 13.

The dimension of the spiral blade 8 is made small in proportion to the diameter of the upper portion of the fermenting reactor 13, where lateral cylindrical cross-sectional area is constant. As a result, in accompaniment with the rotation of the spiral blade 16 in the fermenting reactor 13, as shown by the arrow, a force for pushing the garbage and compost up toward the upper portion and a force for pushing it down from the upper portion to the lower portion are simultaneously generated. In this way, the garbage and the compost received in the fermenting reactor 13 are homogeneously mixed with each other.

The rotating shaft 15 is connected to the drive means 12, such as a motor, through a lower rotating shaft bearing 17 and a gear means 18 and a transmission unit 11. In this embodiment, according to the present invention, two agitating means are driven by one motor and one transmission unit, however it is possible to separately provide a motor for each agitating means. The reference numeral 19 denotes an upper bearing of the rotating shaft 15.

A heater 20 is provided on an outer surface of the fermenting reactor 13. The temperature of this heater 20 is controlled to an appropriate temperature according to the measuring and controlling means 4.

Further, a humidity sensor 21 for detecting the degree of humidity of the fermenting reactor 13 and an oxygen sensor 22 for detecting the oxygen concentration of the fermenting reactor 13 are provided in the fermenting reactor 13. The data measured by the humidity sensor 21 and the oxygen sensor 22 are sent to the measuring and controlling means 4 and this data is utilized as an indication for judging the degree of fermentation of the material in the fermenting reactor 13. In addition, as a further indication for judging the degree of fermentation of the fermenting reactor 13, the moisture content concentration of the fermentation material, the carbon dioxide concentration of carbon dioxide generated from the decomposition of the garbage, the agitating speed of the agitating means and the agitating torque of the agitating means etc. can be utilized.

The reference numeral 23 denotes a ripening reactor for ripening fermentation material C. A receiving box 27 is provided in the ripening reactor 23. The fermentation material C, which represents material that has completed the fermentation treatment in the fermenting reactor 13, in other words the compost produced in the fermentation reactor 13, is discharged from the fermenting reactor 13 and received in the receiving box 27.

A compost discharging port is provided on an upper portion of a side wall of the fermenting reactor 13. The compost discharging port comprises a partitioning wall portion 24 and an opening and closing lid 25, the partitioning wall portion 24 being movable in an upper direction or a lower direction. The compost discharging port can be used to prevent the compost from falling into the receiving box 27 midway of the fermentation treatment and can be used to adjust the amount of compost being discharged.

The compost received in the receiving box 27 possibly has a moisture content of about 10%, however by allowing it to remain for several hours in the receiving box 27, it can be dried to obtain completely matured compost D. To speed up the drying time for the compost received in the receiving box 27, it is desirable to provide the heater 26, and by provision of the heater 26, the drying time of the compost can be shorted by two or three hours. The compost which has completed the fermentation treatment is taken out through the port 28 and is reused as organic compost.

In this embodiment according to the present invention, the fermentation of the garbage is caused by an aerobic fermentation, and so a supplying means 29 for supplying an oxygen containing gas, such as air, is provided, the oxygen containing gas being supplied into the fermenting reactor 13 under control of the measuring and controlling means 4. Further, a deodorizing and exhausting means 30 is provided to effect deodorizing treatment of the gas that is vented out of the fermenting reactor 13 to an outside as air is supplied through the oxygen containing supplying means 29 to the fermenting reactor 13.

The measuring and controlling means 4 carries out various operations, including a lid opening and closing control during the supply of raw garbage material A, a control of the agitating means 14 in the garbage guiding passage 5, a control of the agitating means in the fermenting reactor 13, and a temperature control of the heater 20 provided on the fermenting reactor 13 and the heater 26 provided on the receiving box 27. Further operations carried out by the measuring and controlling means 4 include a judgment of the fermentation condition of the fermentation material in the fermenting reactor 13, an upper and lower moving operation of the partitioning wall portion 24 provided on the compost discharging port in the fermenting reactor 13, and an opening and closing control of the water supply valve when the area in the vicinity of the garbage inlet port 2 is cleaned by water. So as to easily carry out these control operations using the measuring and controlling means 4, it may be desirable to provide a display panel.

With the garbage treating apparatus structure shown in FIG. 1, it is possible to automatically carry out a series of treatment operations during a period from the time the garbage is supplied to the apparatus to the time of completion of the fermentation operation.

Further, in the fermenting reactor 13, since an ascending flow and a descending flow are produced simultaneously in accompaniment with the agitation operation, it is possible to homogeneously mix the garbage in spite of the vertical arrangement of the fermenting reactor structure. Also, since the fermenting reactor 13 is disposed in the vertical direction, it is possible to obtain a compact size apparatus so that a large installing area is not required and in which the torque of the motor can be made smaller in comparison with the lateral arrangement type fermenting reactor.

Figure 2:
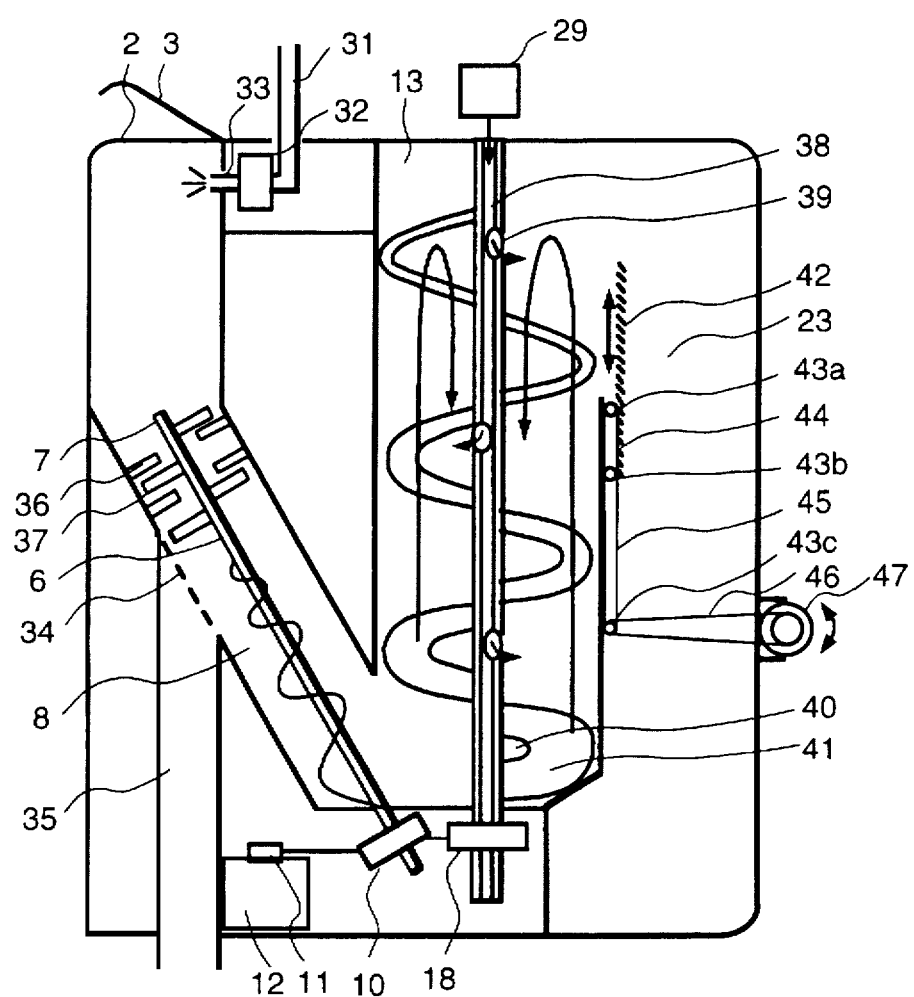
FIG. 2 is a schematic diagram showing another embodiment of a garbage treating apparatus according to the present invention.

FIG. 2 shows another embodiment of a garbage treating apparatus according to the present invention. The structural differences between the garbage treating apparatus shown in FIG. 2 and the garbage treating apparatus shown in FIG. 1 are as follows.

Namely, the structural differences are an additional garbage crushing means provided in the garbage guiding passage, a different from of garbage agitating means provided in the fermenting reactor, a different type of oxygen containing gas supplying means, and a different type of moving means for the partitioning wall portion provided in the compost discharging port of the fermenting reactor.

The garbage crushing means provided in the garbage guiding means comprises plural agitating arms 37 mounted on the rotating shaft 7 and plural fixed arms 36 mounted on an inner wall surface of the garbage guiding passage. When the garbage agitating arms 37 rotate and pass the fixed arms 37 of the garbage crushing means, the garbage is crushed between the agitating arms 37 and the fixed arms 36 so that the garbage is finely crushed.

The agitating means in the fermenting reactor 13 has a spiral blade mounted on the rotating shaft similarly to the apparatus shown in FIG. 1. However, the rotating shaft 38 is in the form of a hollow tube having plural openings 39. Further, the spiral blade 41 having an opening 40 is fixed to the rotating shaft 38, and the size of the opening 40 becomes larger in proportion to the axial position in the vertical direction of the shaft.

With the provision of the spiral blade 41 having the opening 40 in the fermenting reactor 13, as shown by the arrow, a flow from the lower portion to the upper portion can be formed in the vicinity of the wall surface of the cylindrical portion of the fermenting reactor 13. In the vicinity of a central portion of the fermenting reactor 13, a flow from the upper portion to the lower portion through the opening 40 is also formed. As a result, the garbage and the compost can be homogeneously mixed with each other.

Further, a gas, such as air, is supplied to the rotating shaft 38 having the hollow tube form by the oxygen containing gas supplying means 29 and the gas is injected into the fermenting reactor 13 through the openings 39. The oxygen is fully spread all over to the central portion of the fermenting reactor 13 or the bottom portion of the fermenting reactor 13, and accordingly it is possible to provide a suitable condition for the aerobic fermentation operation.

In this embodiment according to the present invention, a partitioning wall 42 is moved in the upper and lower directions through operation pulleys 43a, 43b and 43c, belts 45 and 46, and a motor 47. By driving the motor 47, the positions of the pulleys 43a, 43b and 43c are changed, and so it is possible to change or vary the height of the partitioning wall 42. The reference numeral 44 denotes a fixing portion for fixing the belts 45 and 46 to the partitioning wall 42.

With the garbage treating apparatus structure shown in FIG. 2, since oxygen is fully spread all through the interior portion of the fermenting reactor 13, it is possible to obtain an effect in which the time required for the fermentation treatment can be shortened.

According to the present invention, in the garbage treating apparatus wherein the fermenting reactor is disposed upright with a vertical orientation, the garbage and the compost can be homogeneously mixed with each other, and so a continuous fermentation operation can be attained. Further, a garbage treating apparatus can be provided, wherein a series of fermentation treatment operations from the crushing of the garbage to water cutoff can be automated.

We claim:

1. A garbage treating apparatus, comprising:
   a cylindrical fermenting reactor disposed upright with a vertical orientation;
   an agitator comprising a blade mounted on a vertically extending rotating shaft provided in said fermenting reactor, the blade at at least a lower portion being positioned along an inner wall surface of said fermenting reactor, wherein garbage is introduced into said lower portion of said fermenting reactor and compost produced by a fermentation of the garbage is discharged from an upper portion of said fermenting reactor, and garbage is pushed up toward said upper portion of said fermenting reactor by agitating the garbage through use of said agitator; and
   means for generating a flow of materials in said fermenting reactor from said upper portion of said fermenting reactor toward said lower portion of said fermenting reactor, when the garbage is pushed up from said lower portion of said fermenting reactor toward said upper portion of said fermenting reactor by said agitator.

2. A garbage treating apparatus according to claim 1, wherein
   said flow generating means is provided by varying the horizontal distance between the inner wall surface of said fermenting reactor and a tip end portion of said blade so that said distance is larger in proportion to the proximity to said upper portion of said fermenting reactor;
   whereby, when garbage is pushed up from said lower portion of said fermenting reactor toward said upper portion of said fermenting reactor by said agitator, said flow from said upper portion of said fermenting reactor toward said lower portion of said fermenting reactor is generated at a peripheral portion of said inner wall surface of said fermenting reactor.

3. A garbage treating apparatus according to claim 1, wherein
   said agitator includes a spiral blade mounted on said rotating shaft, and wherein said flow generating means is provided by varying the horizontal distance between an inner wall surface of said fermenting reactor and a tip end portion of said spiral blade so that said distance is larger in proportion to the proximity of said upper portion of said fermenting reactor;
   whereby, when garbage is pushed up from said lower portion of said fermenting reactor toward said upper portion of said fermenting reactor by said agitating means, said flow of garbage from said upper portion of said fermenting reactor toward said lower portion of said fermenting reactor is generated at a peripheral portion of said inner wall surface of said fermenting reactor.

4. A garbage treating apparatus according to claim 3, wherein
   a dimension of said spiral blade is made smaller in proportion to the proximity to said upper portion of said fermenting reactor.

5. A garbage treating apparatus according to claim 3, wherein
   said horizontal distance between said inner wall surface of said fermenting reactor and said tip end portion of said spiral blade is at least five times at an uppermost stage of said spiral blade than that at a lowermost stage of said spiral blade.

6. A garbage treating apparatus according to claim 1, wherein
   said agitator includes a spiral blade mounted on a peripheral portion of said rotating shaft, said spiral blade having an opening, so that, when the garbage is pushed up from said lower portion of said fermenting reactor toward said upper portion of said fermenting reactor with rotation of said spiral blade, said flow of garbage from said upper portion of said fermenting reactor toward said lower portion of said fermenting reactor is generated at a peripheral portion of said rotating shaft.

7. A garbage treating apparatus according to claim 6, wherein
   the length in a horizontal direction of said opening of said spiral blade is at least three times at an uppermost stage at said spiral blade than that of a lowermost stage of said spiral blade.

8. A garbage treating apparatus, comprising:
   a container;
   a cylindrical fermenting reactor disposed upright with a vertical orientation in said container;
   a garbage introducing port provided at a lower portion of said fermenting reactor;
   a discharging port for discharging compost produced by a fermentation of garbage, said discharging port being provided at an upper portion of said fermenting reactor;
   a receiving box for receiving compost discharged from said fermenting reactor;
   a garbage inlet port having a lid provided on said container;
   a passage for guiding the garbage introduced through said garbage inlet port to said garbage introducing port;
   garbage crushing means provided midway of said garbage guiding passage;
   water drainage means provided midway of said garbage guiding passage;
   an agitator for pushing up the garbage by agitating the garbage in said fermenting reactor, a lower portion of said agitator being positioned along an inner surface of said fermenting reactor; and means for generating a flow of materials from said upper portion of said fermenting reactor toward said lower portion of said fermenting reactor, when the garbage is pushed up from said lower portion of said fermenting reactor toward said upper portion of said fermenting reactor by said agitator.

9. A garbage treating apparatus according to claim 8, wherein said drainage means includes:

at least one slit for draining water from a slope surface of said garbage guiding passage; and piping means for discharging water which has passed through said at least one slit toward an outside portion of said container.

10. A garbage treating apparatus according to claim 8, wherein said garbage crushing means comprises plural agitating arms fixed in an axial direction to a rotating shaft and plural stationary arms fixed to an inner wall surface of said garbage guiding passage;

whereby by rotating said agitating arms, garbage is crushed between said agitating arms and said stationary arms.

11. A garbage treating apparatus according to claim 10, further comprising:

a spiral blade mounted on said rotating shaft provided on said garbage guiding passage for transferring garbage alone said garbage guiding passage to said fermenting reactor.

12. A garbage treating apparatus according to claim 8, further comprising:

water injecting means provided in the vicinity of said garbage inlet port for cleaning the area in the vicinity of said garbage inlet port.

13. A garbage treating apparatus according to claim 8, further comprising:

heater means provided on an outer side wall surface of said cylindrical fermenting reactor; and controlling means for controlling the temperature of said heater means.

14. A garbage treating apparatus according to claim 13, further comprising:

detecting means for detecting an oxygen concentration and humidity in said fermenting reactor; and controlling means for controlling an agitating force of said agitator provided in said fermenting reactor based on an output of said detecting means.

15. A garbage treating apparatus according to claim 8, further comprising:

means for supplying an oxygen containing gas into said fermenting reactor from outside of said container.

16. A garbage treating apparatus according to claim 8, further comprising:

a partitioning wall movable in upper and lower directions provided on a side wall of said fermenting reactor in the area of said compost discharging port whereby the height of said compost discharging port can be changed.

17. A garbage treating apparatus according to claim 8, wherein said agitator provided in said fermenting reactor comprises a blade mounted on a rotating shaft;

said rotating shaft being made with a tube form, said tube form rotating shaft having plural passing-through holes spaced along said rotating shaft; and means for supplying an oxygen containing gas into said fermenting reactor through tube form rotating shaft and said passing-through holes from outside of said container.

18. A garbage treating apparatus according to claim 8, further comprising:

removing means for removing humidity and odors in said container.

* * * * *